United States Patent [19]

Coleman

[11] 4,251,736
[45] Feb. 17, 1981

[54] METHOD FOR CONTROLLING POWER FLOW BETWEEN AN ELECTROCHEMICAL CELL AND A POWER GRID

[75] Inventor: Allen K. Coleman, Manchester, Conn.

[73] Assignee: United Technologies Corporation, Hartford, Conn.

[21] Appl. No.: 59,725

[22] Filed: Jul. 23, 1979

[51] Int. Cl.³ ............................................. H02J 3/32
[52] U.S. Cl. ...................................... 307/46; 307/66; 363/95
[58] Field of Search ..................... 307/87, 44, 45, 46, 307/, 48, 66, 72; 363/96, 97, 95

[56] References Cited

U.S. PATENT DOCUMENTS

| 3,566,243 | 2/1971 | Landis | 363/96 |
| 3,821,632 | 6/1974 | Rylicki | 363/96 |
| 3,991,319 | 11/1976 | Seruos et al. | 307/64 |

*Primary Examiner*—Donald A. Griffin
*Assistant Examiner*—James L. Dwyer
*Attorney, Agent, or Firm*—Richard P. Lange

[57] ABSTRACT

A method for controlling a force-commutated inverter coupled between an electrochemical cell and a power grid for adjusting the magnitude and direction of the electrical energy flowing therebetween. Both the real power component and the reactive power component of AC electrical energy flow can be independently varied through the switching waveform presented to the intermediately coupled inverter. A var error signal is derived from a comparison of a var command signal with a signal proportional to the actual reactive power circulating between the inverter and the power grid. This signal is presented to a voltage controller which essentially varies only the effective magnitude of the fundamental voltage waveform out of the inverter, thereby leaving the real power component substantially unaffected. In a similar manner, a power error signal is derived by a comparison of a power command signal with a signal proportional to the actual real power flowing between the electrochemical cell and the power grid. This signal is presented to a phase controller which varies only the phase of the fundamental component of the voltage waveform out of the inverter relative to that of the power grid and changes only the real power in proportion thereto, thus leaving the reactive power component substantially unaffected.

2 Claims, 2 Drawing Figures

METHOD FOR CONTROLLING POWER FLOW BETWEEN AN ELECTROCHEMICAL CELL AND A POWER GRID

BACKGROUND OF THE INVENTION

1. Field of the Invention

This invention relates to a method for controlling a power inverter connected between an electrochemical cell and a power grid, which supplies AC electrical power to a large number of consumers. More specifically, it involves a method for controlling the magnitude and direction of both real power and reactive power flowing between an electrochemical cell and a power grid via a force-commutated inverter allowing the electrochemical cell to be used as an electrical power source, a power storage device, or for power factor adjustment.

2. Description of the Prior Art

Power producing and power storing devices are of particular interest to utility companies who operate extensive power grids which deliver large amounts of AC electrical power through a complex transmission network. Many different types of devices are known for producing electrical energy, one being the electrochemical cell which produces DC power by electrochemical means. Before the electrical power from such a DC device can be introduced into a power grid, it must be converted to AC electrical power. An inverter is one device capable of such a power conversion and a typical inverter includes a number of high-current capacity, solid state switches, such as thyristors, which are periodically transitioned by a control circuit between the conductive and nonconductive states. In turn, this action alternatively connects the positive and negative inputs from the electrochemical cell through the inverter causing AC electrical energy to be presented to the power grid of the electrical utility.

A particular problem associated with the use of electrochemical cells of the battery type as a DC power source is that in the production of large amounts of electrical energy on a long term basis, many batteries consume the active chemical components making up the cell. As a result, unless regenerated from an outside source, the power-producing capability of such electrochemical cells decline rapidly.

A type of electrochemical cell is known as the fuel cell and produces DC electrical energy directly from the oxidation of a fuel from an external source; therefore, it is capable of providing AC electrical pwoer on a sustained basis. Of course, in the same manner as with the battery type of cell, the DC electrical energy must be converted to AC electrical energy for use by the utility. In addition to acting as a source of electrical energy, certain types of electrochemical cells are also suitable for use as a power storing device, this capability existing primarily where the electrochemical cell is regenerative. Thus, the regenerative cells have the ability to convert the active chemical elements, either internally stored or from an external source, into DC electrical energy, and also have the capability of utilizing the DC energy to form active chemical fuels for later use. This bidirectional ability allows the electrochemical cell to be used as a power source during periods of peak power consumption, but during periods of lower power consumption when excess electrical energy is available, the cell converts the excess electrical energy into active chemical elements which is stored for later use.

Of interest is U.S. Pat. No. 3,991,319 issued Nov. 9, 1972 to J. Servos et al for STANDBY POWER SUPPLY SYSTEM. The patent describes a standby power supply including an inverter utilizing a direct current power supply. Synchronizing circuitry is provided to assure the phase and amplitude match of the inverter output to the AC line when the standby power source is utilized. The synchronizing circuit includes a phase detector which receives a feedback signal from the inverter and also senses the AC line voltage. The output from the phase detector is presented through a phase feedback switch to a voltage controlled oscillator to vary the frequency and phase of the output signal. A limitation of this particular system is that it is not suitable for controlling the direction and magnitude of both real power and reactive power between the source and the load.

Also of interest is the copending application U.S. application Ser. No. 59,724 filed July 23, 1979 by the same applicant and assigned to the same assignee as the present invention which describes a circuit configuration including a fast time constant loop and a slow time constant loop for controlling an inverter coupled between an electrochemical cell and the distribution network of a utility.

SUMMARY OF THE INVENTION

According to the present invention, a method is disclosed for controlling the magnitude and direction of electrical energy flowing between an electrochemical cell and a power grid.

An advantage of the method according to the present invention is that both the magnitude and direction of both real power and reactive power or vars (volt amps reactive) of electrical energy flowing between an electrochemical cell and a power grid can be independently and conveniently adjusted over the operating range of the DC source.

A particular feature of the present invention is that a var error signal derived from the comparison of a var command signal with the actual vars flowing between an electrochemical cell and a power grid is used to adjust the effective voltage magnitude of the inverter fundamental waveform thereby allowing the var component to be varied almost independently of the real power. In a similar manner, a power error signal is derived by a comparison of a power command signal with the actual power flowing between an electrochemical cell and a power grid is presented to a phase control loop which varies the phase of the fundamental inverter output waveform with respect to that of the power grid to vary the power flow therebetween, independent of vars.

A significant aspect of the method according to the present invention is based on the recognition that the real power flowing through an inverter from an electrochemical cell is most sensitive to the phase angle between the fundamental voltage waveform of the inverter and that of the power grid and that this phase sensitivity of the real power flow is almost independent of the reactive power or vars. In other words, it was recognized that the electrical energy passing between an electrochemical cell, through an inverter, to a power grid could be independently controlled by varying the phase angle between the voltage fundamental output waveform of the inverter and that of the power grid. In a similar fashion, it was recognized that reactive power or vars flowing between an electrochemical cell, through an inverter, to a power grid is most sensitive to the effective amplitude of the voltage fundamental waveform out of the inverter with respect to the amplitude of the voltage waveform of the utility.

Other objects, features and advantages of the present invention will become apparent in light of the following detailed description of a preferred embodiment as illustrated in the accompanying drawing.

DETAILED DESCRIPTION OF THE ILLUSTRATED EMBODIMENT

Figure 1:
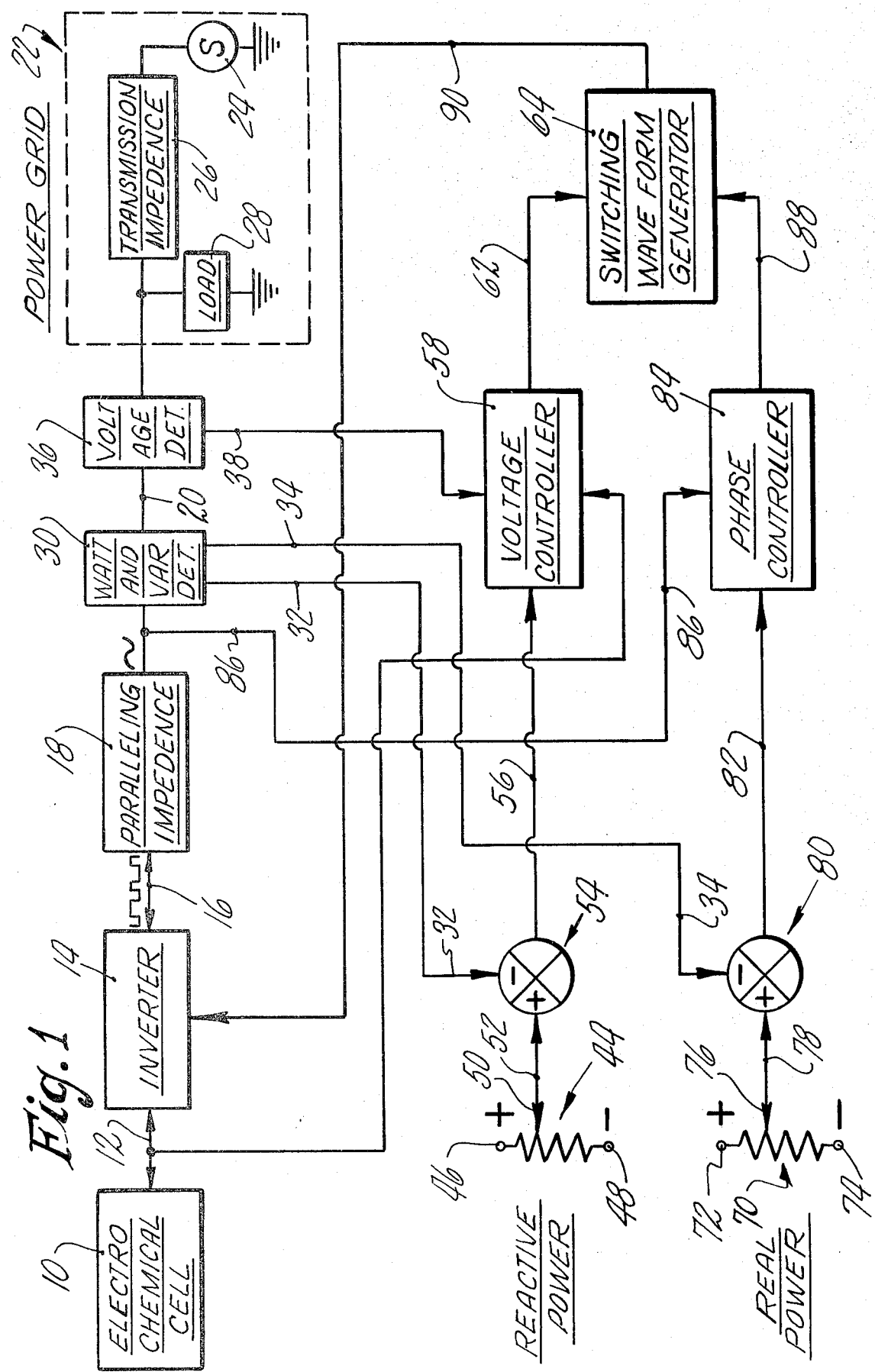
FIG. 1 is a schematic illustration of one embodiment for implementing the method of the present invention.

Referring initially to FIG. 1, there is seen one embodiment of a device for implementing the method according to the present invention. An electrochemical cell 10, such as a fuel cell or battery or other comparable DC device, is connected by a line 12 to a force-commutated inverter 14, the line 12 normally including a negative bus and a positive bus. It should be understood that although both force-commutated inverters and line-commutated inverters are known, the present invention applies primarily to the force-commutated type of inverter because the solid state switching elements are typically not primarily dependent on the phase relationship of the voltage-current waveforms on the power grid 20 for turning off. The inverter 14 typically includes at least one or more pairs of switching elements, and by alternatively actuating these elements, the negative and positive input buses at the DC side are connected through the inverter to the AC side forming an AC signal which includes a fundamental signal together with numerous harmonics. The AC line of the inverter 14 is connected by a line 16 to a paralleling impedance 18, which may include a filter which is selected to pass signals of the frequency at which the power grid operates, normally 60 Hertz, and to reject signals outside that frequency. The paralleling impedance 18 may also include any power transformer and/or harmonic cancellation reactors for conditioning the final AC waveform for presentation to the power grid 20.

As is seen in FIG. 1, a power grid 22 typically includes at least one source of AC electrical energy 24, a transmission impedance 26 which would include the impedance of any transmission line and also the impedance of the source, and at least one load 28 where electrical energy is consumed. However, the usual case is much more complex than the simple illustration in that most often there is a number of power sources together with a vast number of separate loads that draw different amounts of electrical energy at different times, all of which are interconnected by transmission lines. In any event for the model on which the present invention is based the worst case has been illustrated here, that being where the load is located immediately adjacent the inverter 14.

As is well known, there are many locations or separate points in a power grid at which it is desirable to control add or store real power, or just to adjust the situs power factor. The method of the present invention affords an extremely high degree of flexibility in the control of these important parameters. Accordingly, the electrochemical cell 10 can be used as a source of energy during periods when the power grid 22 is experiencing high load or demand for electrical power but when there is an excess of power in the power grid 22, the direction of power flow can be reversed allowing energy to be stored in the electrochemical cell 10. In addition, it is also beneficial to be able to easily control the reactive power or vars (volt amps reactive) of the load to assist power factor adjustment at a specific situs of the power grid 22.

The method according to the present invention for the independent adjustment of both the magnitude and direction of electrical energy, and also the relative power factor thereof, will now be described in conjunction with one embodiment of a control circuit for the inverter 14 which is connected between the electrochemical cell 10 and one point of the power grid 22.

A power detector 30 is positioned in the line 20 to sense the magnitude and direction of both the real power flow and the reactive power flow between the inverter 14 and the power grid 22. In operation, the power detector 30 presents an output signal on the line 32 which is proportional to the magnitude and the direction of the reactive power or vars flowing in the line 20. In a similar manner, the power detector 30 presents on line 34 which is proportional to the magnitude and direction of the real power flowing in the line 20. A voltage detector 36 is also connected to the line 20 and presents a signal on a line 38 which is proportional to the magnitude of the voltage waveform on the line 20, this being both the fundamental component of the voltage waveform out of the inverter and also the voltage waveform existing on the power grid.

As illustrated, an adjustable var command signal can be formed from a variable potentiometer 44 which has one terminal 46 coupled to a source of positive reference potential while the other terminal 48 is connected to a source of negative reference potential. The control terminal 50 presents a desired voltage level which can be adjusted over a suitable range over a line 52 to one input of a first comparator 54. The other input of the first comparator 54 is connected to the lead 32 to receive the signal which is proportional to the magnitude and direction of the reactive power flowing in the line 20. The first comparator circuit 54 combines the var command signal on the line 52 with the signal from the detector 32 indicating the actual magnitude and direction of the reactive power, and presents a var error signal at its output on the line 56 to the voltage controller 58.

The voltage controller 58 is connected to the line 38 and the voltage sensor 36 for receiving a signal proportional to the magnitude of the AC voltage on the line 20; and, it is also connected to line 12 to sense the level of the DC voltage from the electrochemical cell 10. The voltage control loop compares a difference signal derived from the respective magnitudes of the output of the electrochemical cell 10 and that on the line 20 and combines it with the var error signal received on the line 56 to form a control signal at its output on the line 62 which is presented to a gating waveform generator 64. The signal on the line 62 causes the gating waveform generator 64 to adjust the firing points of the semiconductor switches in the inverter 14 such that the effective voltage of the fundamental signal waveform out of the inverter is increased or decreased in proportion to the signal on the line 62. As is seen in FIG. 2, this in essence causes a change in the var isoquant on which the inverter is operating.

Still referring to FIG. 1, in a manner similar to that described heretofore, an adjustable power command signal can be simply and easily formed by a variable potentiometer 70 which has one terminal 72 coupled to a positive source of reference potential while the other terminal 74 is connected to a negative source of reference potential. The control terminal 76 presents a voltage level which can be varied over a suitable range to a line 78 and one input of a second comparator 80. The other input of the comparator 80 is connected to the line 34 for receiving a signal that is proportional to the magnitude and direction of the real power flowing in the line 20. The second comparator 80 creates a power error signal at its output on the line 82 by differentially combining the power command signal with the sensed signal on the line 34 and this signal is presented via a line 82 to a phase controller 84. The phase controller 84 is also coupled by line 86 to the line 20 for sensing the phase of the AC signal on the line 20 and provides a phase offset therefrom in proportion to the input signal on the line 82 at its output on the line 88. The gating waveform generator 64 is connected to the line 88 and combines this phase offset waveform signal with the voltage control signal received on the line 62 to provide a control signal at its output on the line 90 which is presented to the inverter 14.

As briefly mentioned herebefore, a particular advantage of the method according to the present invention is that it is well suited for adjusting the power flow between the electrochemical cell and the power grid by controlling the inverter connected therebetween. Further, an additional benefit of the present invention is that a reactive component of the AC electrical energy flowing through the inverter can also be easily controlled, and controlled in a manner such that both the reactive power component and real power component are independently adjustable, i.e. real power can be varied without substantially changing the reactive power, and vice versa. This is particularly significant because it means the electrochemical cell/inverter combination has the flexibility of operating as either a power source, a power storage device, or a power factor adjustment device for the power grid 22, this latter capability being somewhat similar to that function performed by a capacitor bank but with a continuously variable capability over the operating range of the combination. The characteristics of the present invention are probably best understood by referring to the graphic depiction illustrated in FIG. 2. As shown, this graph demonstrates the operating parameters of the present invention by depicting the manner in which voltage variations and phase change at the AC side of the inverter 14 cause corresponding variations in the real power component and reactive power component of power flow. For example, it can be noted that if the effective magnitude of the voltage waveform from the inverter is varied, (a change in the Y direction) then a change in the magnitude of the reactive power on line 20 also occurs; and, this change is substantially proportional to the overall change in direction and magnitude of the inverter voltage waveform, this being related in a known manner to the precise switching point of the thyristors in the inverter. It is also important to note that the var isoquant (locus of constant reactive power) is, for the most part, horizontal or parallel with the X axis. Thus it is relatively unaffected by changes in the relative phase of the fundamental voltage waveform from the AC side of the inverter compared with that of the power grid. This means for any given var error signal out of the first comparator 54 on the line 56, any phase variations between the inverter voltage waveform and that of the power grid causes little, if any, change in the reactive power component flowing through the inverter. But rather, the var error signal in the present invention causes the voltage controller 58 to supply a signal to the gating waveform generator 64 which in turn results in an adjustment in the firing points of the solid state switches in the inverter 14 that, in essence, only affects the magnitude of the fundamental voltage waveform out of the inverter but does not make any change that would affect the phase of the fundamental phase component of that voltage waveform.

Figure 2:
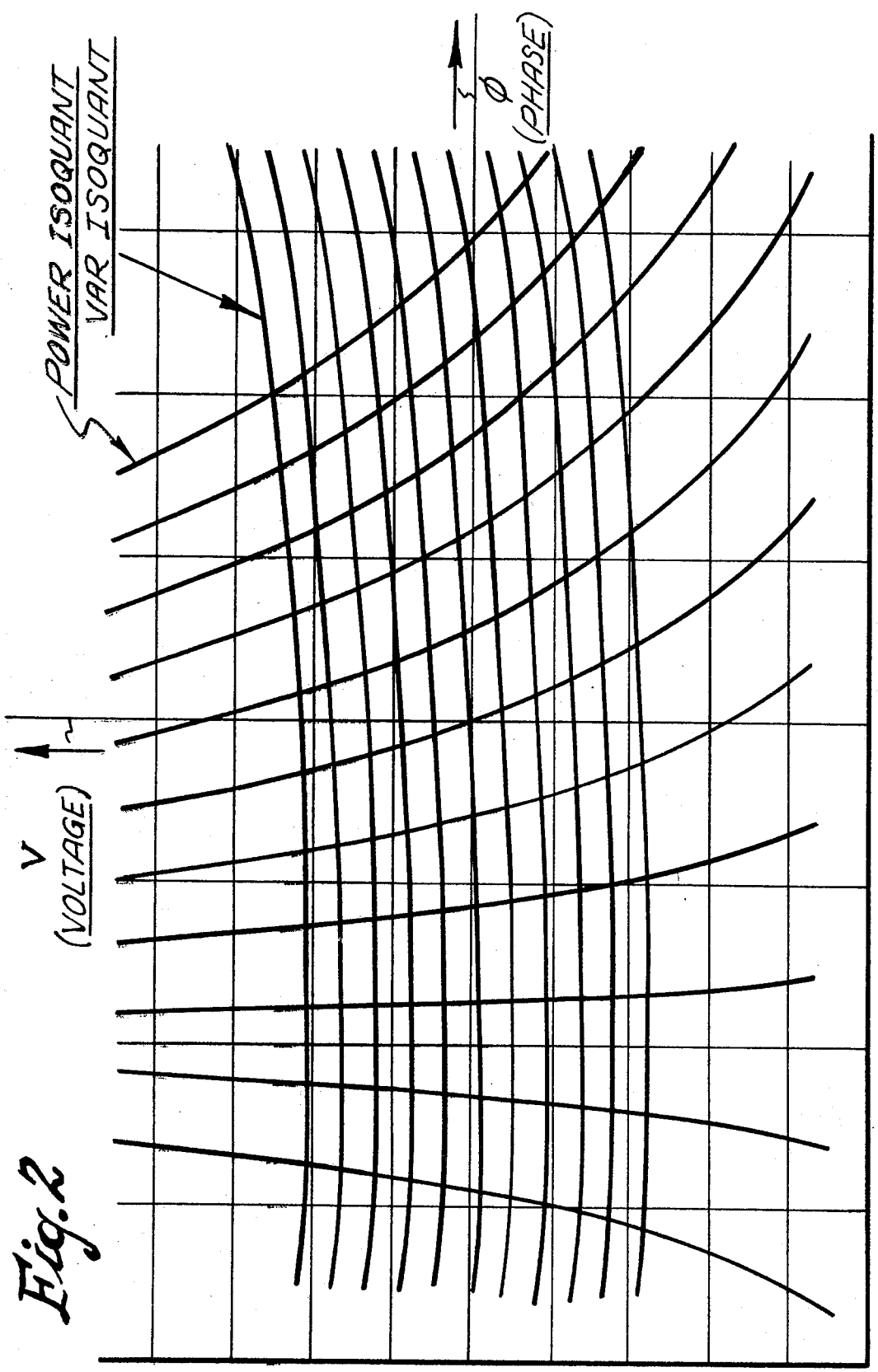
FIG. 2 is a graph depicting the variation in power and vars of the embodiment illustrated in FIG. 1 as a function of voltage and phase at the output of the inverter.

In a similar manner it can also be noted from the graph on FIG. 2 that the magnitude and direction of real power flowing between the electrochemical cell 10 and the power grid 22 is primarily related to only the phase of the fundamental component of the AC power out of the inverter on line 16 and that of the power grid on line 20. In other words, the power isoquant (locus of equal power points) on this graph is relatively vertical so that a change in just the phase of the fundamental component at the AC side of the inverter causes a proportional change in only the power flowing through the inverter; and, this is substantially unaffected by a variation in the relative effective magnitudes of the two voltage waveforms. Accordingly, in the present invention the real power error signal formed by a comparison of the command signal with the actual real power in the line 20 is presented to only the phase controller 84 which, through the gating waveform generator 64, changes just the firing points of the solid state switches in the inverter such that only the phase of the AC fundamental waveform out of the inverter is proportionally varied, not the effective magnitude of that waveform.

Still referring to FIG. 2, it should be understood that the circuit parameters which give rise to the particular isoquant curves are valid for only one particular set of circuit parameters. For example, if the inductance of the parelleling impedance 18 is increased, the var isoquants will no longer remain substantially a function of only the voltage waveform of the fundamental component of the inverter and that of the power grid, but will also be affected by phase changes. In a similar manner the power isoquants will also change such that the real power flowing between the power grid and the inverter will, in addition to being a function of the phase of the fundamental voltage waveform of the inverter with respect to that of the power grid, will also be affected by any phase differences therebetween. Accordingly, as the inductance in the paralleling impedance increases, the power and var isoquants lose their orthogonal relationship thus these two characteristics are no longer independent and isolated from each other, and in the extreme move toward a slope of 45 degrees.

Although the invention has been shown and described with respect to a preferred embodiment thereof, it should be understood by those skilled in the art that various changes and omissions in the form and detail thereof may be made without departing from the spirit and scope of the invention.

Having thus described typical embodiments of my invention, that which I claim as new and desire to secure by Letters Patent of the United States is:

1. A method for adjusting the magnitude and direction of electrical power flowing from an electrochemical cell through an inverter to a power grid, or the like, comprising:

providing a reactive power command signal and a real power command signal, each of which is respectively proportional to the desired reactive power and real power energy flow between said electrochemical cell and said utility;

comparing said reactive power command signal and said real power command signal with a sensed signal which is proportional to the actual reactive power and real power components of energy flow, respectively, between said electrochemical cell and said utility to derive a reactive power error signal and a real power error signal;

comparing said reactive power error signal with the difference between the voltage of said electrochemical cell and said power grid voltage to form a voltage control signal for varying the amplitude of said fundamental signal waveform out of said inverter;

comparing said real power error command signal with a signal proportional to the phase of said fundamental signal waveform supplied to said inverter to form a phase control signal for varying the phase difference between the inverter fundamental signal waveform and that of said power grid waveform; and adjusting the phase of the switching points of a switching waveform pattern in the inverter in response to the voltage control signal and the phase control signal.

2. A method according to claim 1, wherein said reactive power command signal and said real power command signal are independently adjustable so that the reactive power component and real power component of electrical energy flow can be separately controlled.

* * * * *

UNITED STATES PATENT AND TRADEMARK OFFICE
CERTIFICATE OF CORRECTION

PATENT NO. : 4,251,736
DATED : February 17, 1981
INVENTOR(S) : ALLEN K. COLEMAN

It is certified that error appears in the above-identified patent and that said Letters Patent is hereby corrected as shown below:

Column 7, line 12, change "utility" to -- power grid --

Column 7, line 18, change "utility" to -- power grid --

Column 8, line 7, change "to" to -- from --

Signed and Sealed this

Tenth Day of May 1983

[SEAL]

Attest:

Attesting Officer

GERALD J. MOSSINGHOFF

Commissioner of Patents and Trademarks